US009959868B1

(12) United States Patent
Patel et al.

(10) Patent No.: US 9,959,868 B1
(45) Date of Patent: May 1, 2018

(54) CONVERSATIONAL PROGRAMMING INTERFACE

(71) Applicant: Wisconsin Alumni Research Foundation, Madison, WI (US)

(72) Inventors: Jignesh M. Patel, Madison, WI (US); Navneet Sankara Potti, Madison, WI (US); Rogers Jeffrey Leo John, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days. days.

(21) Appl. No.: 15/454,764

(22) Filed: Mar. 9, 2017

(51) Int. Cl.
| | |
|---|---|
| *G10L 15/22* | (2006.01) |
| *G06F 17/28* | (2006.01) |
| *G10L 15/19* | (2013.01) |
| *G06F 17/24* | (2006.01) |

(52) U.S. Cl.
CPC .............. *G10L 15/22* (2013.01); *G06F 17/24* (2013.01); *G06F 17/289* (2013.01); *G06F 17/2809* (2013.01); *G06F 17/2881* (2013.01); *G10L 15/19* (2013.01); *G10L 2015/223* (2013.01)

(58) Field of Classification Search
CPC . G10L 15/22; G10L 17/2809; G10L 17/2881; G10L 17/28; G10L 17/289; G06F 17/2809; G06F 17/2881; G06F 17/28; G06F 17/289
See application file for complete search history.

(56) References Cited

U.S. PATENT DOCUMENTS

| | | | |
|---|---|---|---|
| 5,555,169 A * | 9/1996 | Namba | G06F 17/274 704/9 |
| 6,622,119 B1 * | 9/2003 | Ramaswamy | G06F 17/276 704/275 |
| 8,756,499 B1 * | 6/2014 | Kataoka | G06F 17/276 715/259 |
| 9,734,193 B2 * | 8/2017 | Rhoten | G06F 17/30401 |
| 9,772,994 B2 * | 9/2017 | Karov | G06F 17/2785 |
| 2003/0115080 A1 * | 6/2003 | Kasravi | G06F 17/27 715/254 |
| 2004/0083101 A1 * | 4/2004 | Brown | G10L 15/1822 704/235 |
| 2005/0081146 A1 * | 4/2005 | Tanaka | G06F 17/2775 715/243 |
| 2007/0299824 A1 * | 12/2007 | Pan | G06F 17/2785 |
| 2011/0201387 A1 * | 8/2011 | Paek | G06F 3/0237 455/566 |
| 2014/0136187 A1 * | 5/2014 | Wolverton | G06F 17/30654 704/9 |
| 2015/0012829 A1 * | 1/2015 | Brown | G06F 3/167 715/728 |
| 2015/0032443 A1 * | 1/2015 | Karov | G06F 17/2785 704/9 |
| 2015/0348565 A1 * | 12/2015 | Rhoten | G06F 17/30401 704/270.1 |
| 2016/0154791 A1 * | 6/2016 | Cheng | G06F 17/2785 704/9 |
| 2016/0219048 A1 * | 7/2016 | Porras | H04L 63/20 |
| 2016/0328407 A1 * | 11/2016 | Levy | G06F 17/2715 |

* cited by examiner

*Primary Examiner* — Eric Yen
(74) *Attorney, Agent, or Firm* — Boyle Fredrickson, S.C.

(57) ABSTRACT

Domain specific programming is facilitated through the use of a conversational interface using natural language commands from the user and natural language cues to the user. The natural language conversation provides the actual program and thus can be saved and edited for future use.

17 Claims, 3 Drawing Sheets

CONVERSATIONAL PROGRAMMING INTERFACE

STATEMENT REGARDING FEDERALLY SPONSORED RESEARCH OR DEVELOPMENT

This invention was made with government support under IIS0963993 and IIS1250886 awarded by the National Science Foundation, and AI17924 awarded by the National Institutes of Health. The government has certain rights in the invention.

CROSS REFERENCE TO RELATED APPLICATION

N/A

BACKGROUND OF THE INVENTION

The present invention relates to a system and method for programming electronic computers and in particular to a programming method that captures a program in natural language to improve the accessibility of sophisticated computational tools to occasional users.

Computers have provided data scientists with a wide array of tools and processes, for example, for the analysis of data particularly as captured in large databases. Making effective use of these tools, however, can be difficult, typically requiring that the domain specialist (having knowledge of the data) work with a data scientist (having knowledge of the computerized tools) to apply the tools to a particular analysis problem. This division of the task among two individuals generally increases the time and cost of using otherwise powerful computerized tools, creates a risk of misinterpretation and translation errors in the communication between the individuals, and makes experimentation and iteration of the type often required in data analysis cumbersome.

The problem of making sophisticated computerized tools more accessible is addressed in part by the creation of special high-level languages that invoke these computerized tools, these special, high-level languages intended to be easy to use by domain specialists by providing interfaces (such as graphical interfaces or the like) that help construct programs to use the computerized tools, or by attempting to partially or fully automate the programming process.

A fundamental problem with simplified programming languages is the relatively low tolerance occasional users have for learning specialized programming languages which necessarily mirror the complexity of the tools that they invoke. To the extent that such specialized programming languages are well adapted for a particular problem, for example, automating steps to reduce the complexity of the problem, such languages may lose flexibility by being over-adapted to a narrow set of problems, thereby being unsuitable to the domain specialist having a variety of data analysis problems.

SUMMARY OF THE INVENTION

The present invention provides a programming language that adopts a conversational paradigm of constrained natural language. By using natural language, for example, implemented by a chat-bot or the like, special commands and syntaxes can be avoided. Importantly, the conversation allows the introduction of conversational style hints and directions to the user, preventing the user from having to commit a wide variety of commands and options to memory. To the extent that users may be assumed to have natural facility with real language, a natural language conversation requires very little learning overhead. In addition, the natural language conversation when recorded provides a simple and easily accessible "source code" capturing a programming solution that may be reused and modified.

Specifically, in one embodiment, the invention provides a computerized user interface for data analysis comprising an electronic computer having a processor, an electronic memory communicating with the processor and holding a program-generating program, a set of multi-instruction program components and a user interface communicating with the processor. The processor executes the program to generate a conversation comprised of: (i) natural language phrases input by a user using the user interface and designating one or more data sets for analysis and one or more analysis tools to be used in the analysis; and (ii) natural language phrases output by the computer using the user interface in response to the natural language phrases input by the user and providing the user with guidance for additional natural language phrases input by the user. This conversation may be recorded and executed, the execution mapping the natural language phrases input by the user to corresponding multi-instruction program components to create a data analysis program implementing analysis of the one or more analysis tools on the data set. Execution of this data analysis program outputs analysis to the user interface.

It is thus a feature of at least one embodiment of the invention to substantially increase the accessibility of domain specific computer tools to occasional users by constraining the interface to natural language conversation providing a two-way communication flow that prevents the need for the user to commit to memory details of the tool operations.

The program-generating program may further display the conversation contemporaneously with generation of the program.

It is thus a feature of at least one embodiment of the invention to provide a running record of the conversation both for reference by the user during generation of the program and a guide to future users of the program where the conversation provides context to the program logic analogous to "comments" used in standard computer source code.

The program-generating program may further operate to: (d) store and recall the conversation; and (e) edit the recalled conversation before repeating step (c).

It is thus a feature of at least one embodiment of the invention to provide a programming interface generating a conversation that is in fact executable code subject to editing and reuse. In this way the accessibility of the computer tools is increased for both first time and subsequent use.

The recalled conversation may be displayed and the editing guided by identifying portions of the conversation on the display and editing those portions through the addition of new natural language phrases input by the user.

It is thus a feature of at least one embodiment of the invention to permit editing of the program in the natural language domain, preserving the conversational nature of the program in a way that is consistent with the goal of increased accessibility of computer tools.

The editing of the recalled conversation may permit removal of natural language phrases and the addition of natural language phrases at a variety of points within the conversation, and the removal of a natural language phrase from the conversation may cause a removal of a corresponding multi-instruction program component during execution of the conversation, and the addition of a natural language phrase to the conversation may cause an addition of a corresponding multi-instruction program component during the execution.

It is thus a feature of at least one embodiment of the invention to provide a simple method of ensuring consistency (executability) of the program during natural language editing.

The program-generating program may further include a predefined multi-state template designating steps for a workflow, the multi-state template defining states associated with predefined possible natural language phrases output by the computer and state transitions associated with predefined possible natural language phrases input by the user.

It is thus a feature of at least one embodiment of the invention to provide a simple method of converting computerized tools to the natural language interface through the use of an overarching multi-state template to which natural language cues and grammars may be attached.

The natural language phrases output by the computer may provide hints with respect to possible state transitions of the predefined multi-state template for a given current state of the multi-state template.

It is thus a feature of at least one embodiment of the invention to provide natural language support to the user that is a dynamic function of the current state in the multi-state template, that is, to provide context-sensitive support to the user.

The predefined possible natural language phrases input by the user may each be associated with a corresponding multi-instruction program component.

It is thus a feature of at least one embodiment of the invention to provide a simple method of converting natural language phrases into executable programs by providing a simple mapping between natural language phrases and program fragments.

The multi-state template may be composed of modules each providing multiple states and selected from the group consisting of states related to: data loading, data cleaning, data analysis, model selection, and visualization of analysis.

It is thus a feature of at least one embodiment of the invention to provide a simple method of increasing the accessibility of data analysis tools to domain experts.

The modules may provide for standardized interfaces so that a given module of the multi-state template can be replaced by a different module.

It is thus a feature of at least one embodiment of the invention to simplify the updating and expansion of the tools accessed by the present invention.

These particular objects and advantages may apply to only some embodiments falling within the claims and thus do not define the scope of the invention.

DETAILED DESCRIPTION OF THE PREFERRED EMBODIMENT

Figure 1:
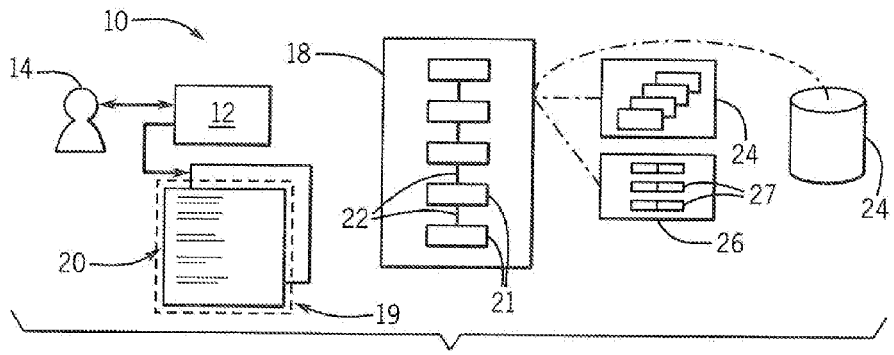
FIG. 1 is a simplified block diagram of the interface of the present invention employing a chat-bot driven by a multi-state template linked to a set of code fragments and standardize data objects producing a conversation that may be displayed and recorded.

Referring now to FIG. 1, a conversational programming interface 10 of the present invention may provide for a chat-bot 12 for receiving and interpreting natural language statements from a domain expert 14 and for outputting natural language statements to the domain expert 14. This communication may be implemented in a variety of means, for example, through speech recognition and text synthesis or by means of a combination of a keyboard and graphic display as will be discussed in detail below.

As is generally understood in the art, a chat-bot 12 is a program that provides the ability to communicate through controlled natural language (CNL) statements, being a constrained set of syntactically correct sentences understandable to native speakers of a language. Generally, these statements are a subset of possible statements in the language and may be analyzed by the chat-bot 12 according to an internally defined grammar to extract underlining meaning. The chat-bot 12 may also output syntactically correct natural language statements also being part of a controlled natural language set. In one embodiment, the controlled natural language may consist of sentence structures having the following form: <ACTION VERB><NOUN> <PREDICATE>. A chat-bot 12 suitable for this purpose is described in R. Schwitter, Controlled natural languages for knowledge representation, in Proceedings of the International Conference on Computational Linguistics, pp. 1113-1121, 2010, hereby incorporated by reference.

The natural language statements received by the chat-bot 12 from the domain expert 14 may be recorded in a file 16 and simultaneously displayed on a display 19 together with the natural language statements from the chat-bot 12 to the domain expert 14, the latter interleaved with the former in a human readable conversational conversation 20 having the visual form of a standard natural language dialogue, for example, with each statement attributed to a "speaker" being either the chat-bet 12 or the domain expert 14.

Alternatively, the natural language statements received by the chat-bet 12 from the domain expert 14 may be preprocessed for content by the chat-bet 12 and then re-formed into an interpreted natural language statement having identical meaning to the statement received by the chat-bet 12. This latter interpreted natural language statement may then be displayed and recorded so as to better reveal the understanding of the chat-bet 12.

Generally the chat-bot 12, as noted, may work with a constrained grammar and cue-vocabulary which will be provided by a multi-state template 18. The multi-state template 18 may include a set of stages 21 defining particular steps in a domain specific problem such as data analysis, and operates to provide natural language cues to the domain expert 14 at each stage. The stages 21 are linked stage transitions 22 in the manner of a cyclic graph, the stage transitions 22 each associated with rules determining when the stage transitions 22 are invoked and each linked to a grammar describing natural language statements that must be received by the chat-bet 12 to satisfy the rule of the stage transition 22. An example multi-state template 18 will be described below.

The multi-state template 18 may communicate with a library of code fragments 24 representing methods or tasks that can be implemented for data analysis of a type desired by the domain expert 14. Generally the code fragments 24 will represent common tools or tasks used in data analysis and may be written in a variety of different languages or scripts as desired. Accordingly, the code fragments 24 may make use of the most convenient language for the given task including general purpose programming language like Python, R or Scala, and may use pre-existing libraries like Scikit-learn, Caret or Spark.

The code fragments 24 may operate on predefined standardized variables so that they may be compatible and seamlessly communicate data. These predefined standardized variables may be in the form of data objects 27 of a data object table 26 and allow, for example, for the output of one code fragment 24 to provide data that can be then used as inputs to other code fragments 24 without further programming.

As will be discussed below, these data objects 27 of data object table 26 will be linked to specified user data identified by the domain expert 14 during use of the conversational programming interface 10. The user-specified data may be held in a user data repository 28. In operation, the multi-state template 18 will generally invoke a set of code fragments 24 to operate on the data objects 27 according to the conversation 20, the data objects previously linked to specific user data in the user data repository 28.

Figure 2:
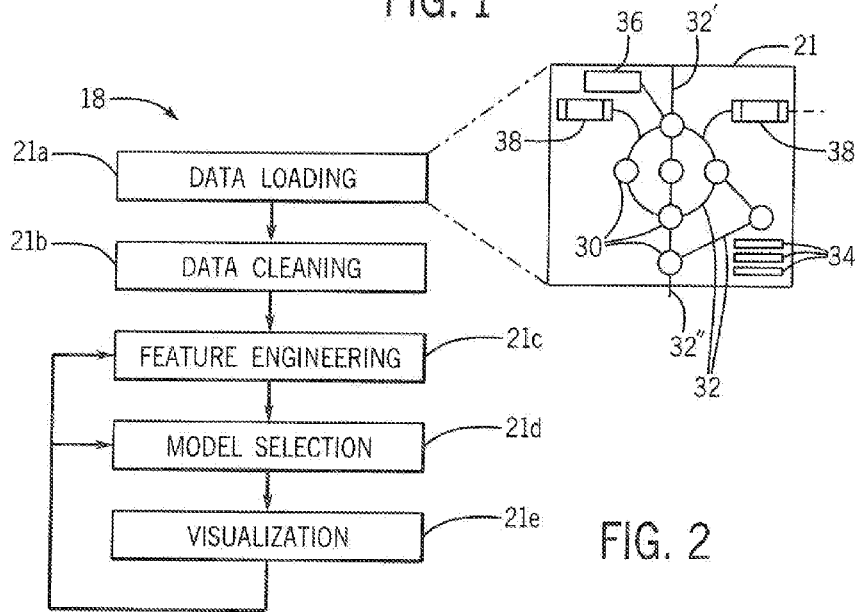
FIG. 2 is an expanded depiction of the multi-state template showing primary states for a data analysis template each including sub-stages associated with natural language cues and grammars.

Referring now to FIG. 2, an example set of stages 21a-e suitable for data analysis may include: a stage 21a of data loading, where data to be analyzed by the domain expert 14 is identified in the data repository 28; a stage 21b of data cleaning, where clearly erroneous data and missing data is corrected or completed; a stage 21c of feature engineering, for example, where types of nonnumeric data are encoded or partitioned for numeric analysis; a stage 21d of model selection wherein an analysis model is selected possibly with feedback to the user (e.g., using ROC curves or $R^2$ values) with respect to precision and recall; and a stage 21e of visualization where the analysis is visualized, for example, in a chart type (e.g., histograms, scatterplots, etc.) selected by the user. Generally the multi-state template 18 contemplates that the analysis will be iterative with stages 21c or 21d being repeated one or more times with modifications after visualization of stage 21e.

Each of the stages 21 may include multiple sub-stages 30 interconnected by state transitions 32. In a simple case, the sub-stages 30 of the stages 21 may have a single entry point state transition 32' and exit point state transition 32" allowing each of the stages 21 to be easily integrated with other stages 21 through interconnection of a single state transition. Each of the stages 21 may also identify a set of input and output variables 34 used by the stage 21 to facilitate the interconnection of stage 21, or swapping of one stage 21 with other similar stages 21, for example, when different data cleaning stages 21 might be used. The set of input and output variables 34 may be used to make sure the stages 21 are compatible, that is, finding input variables in one of the earlier stages 21 and providing output variables that are used by one of the later stages 21. The set of input and output variables 34 may also identify data types for compatibility, for example, a data loading stage 21 may identify a standard variable being a target database in a particular format, for example, comma separated values (CSV). Object wrappers for the data objects 27 may provide for basic conversion between different data types.

Each sub-stage 30 of each stage 21 of the multi-state template 18 may be associated with a natural language output cue 36 providing information to the domain expert 14 through the chat-bot 12 when that sub-stage 30 is encountered. Similarly, each state transition 32 may be associated with a natural language input grammar 38 describing valid natural language inputs received from the domain expert 14 through the chat-bot 12 such as will invoke the state transition 32. Generally, the natural language input grammar 38 will describe the content of a received statement from the domain expert 14 rather than an exact statement (through the interpretive abilities of the chat-bot 12) so that the state transition 32 may be invoked by a variety of different natural language statements having identical content.

Figure 5:
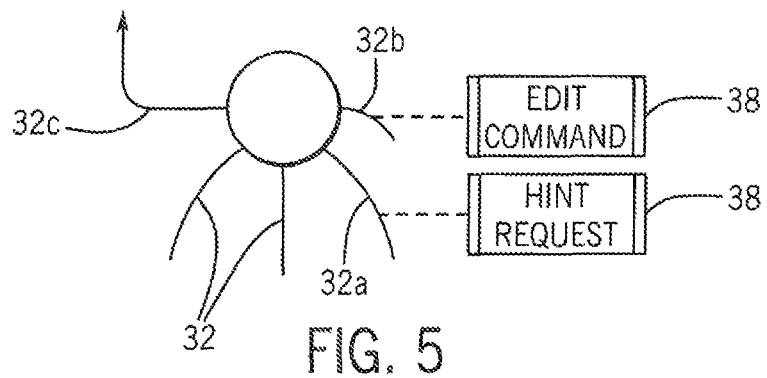
FIG. 5 is a depiction of an example sub-state multi-state template showing common state transitions for providing a hint to the user or accepting edit commands.

Referring now also to FIG. 5, normally the natural language output cue 36 of each sub-stage 30 will provide the user with a current context of the data processing task; however, desirably each of the sub-stages 30 will also provide at least one state transition 32a that can provide a state-appropriate hint to the domain expert 14 on request, for example, triggered by a question such as "what are my options here?" The hints associated with each sub-stage 30 may also or alternatively provide an indication of the types of state transitions 32 that are available. The invention contemplates that one natural language input grammar 38 may invoke a listing of all possible state transition types, for example, like a "list" command.

In addition each sub-stage 30 may include state transition 32b allowing for editing of the conversation 20, for example, replacement or modification of previous natural language statements by the domain expert 14 previously enrolled in the conversation 20. These editing commands are not entered into the conversation 20 but instead operate to modify the conversation 20. The invention contemplates that some of the state transitions 32c may provide for a looping back to previous sub-stages 30, for example, when iteration or revision is desired.

Figure 6:
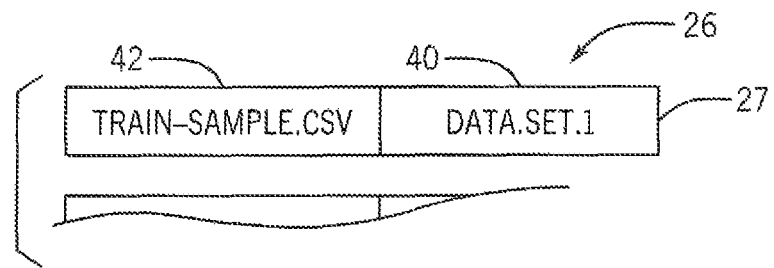
FIG. 6 is a detailed depiction of standardized data objects linked to aliases used by a domain specialist.

Both the natural language output cues 36 and natural language input grammars 38 may include placeholders for receiving or outputting user-designated variable names. These user designated variable names will be linked to the standardized data objects 27 which will hold the underlying data. Referring also to FIG. 6, in this regard, the data objects 27 may thus provide both a standardized data object name 40 used by the program fragments 24 linked to an alias 42 used by the domain expert 14 and in the placeholders of the natural language conversation 20. Thus, for example, the natural language input grammar 38 may have a placeholder to receive a name of a file to be processed from data repository 28 designated "train_sample.csv" being a user supplied name. This user-supplied name is then associated with a standard data object for processing "data_set_1" that will be used by the code fragments 24. The chat-bot 12 may extract the user-supplied alias 42 from natural language statements and link them to the standardized data object name 40 implicated by the current sub-stage 30. At that point, the alias 42 will be used in all communications with the domain expert 14. During the loading of data to be described below, the data associated with the user supply alias 42 will be loaded into the a standardized data object 27 associated with a data object name 40.

Figure 4:
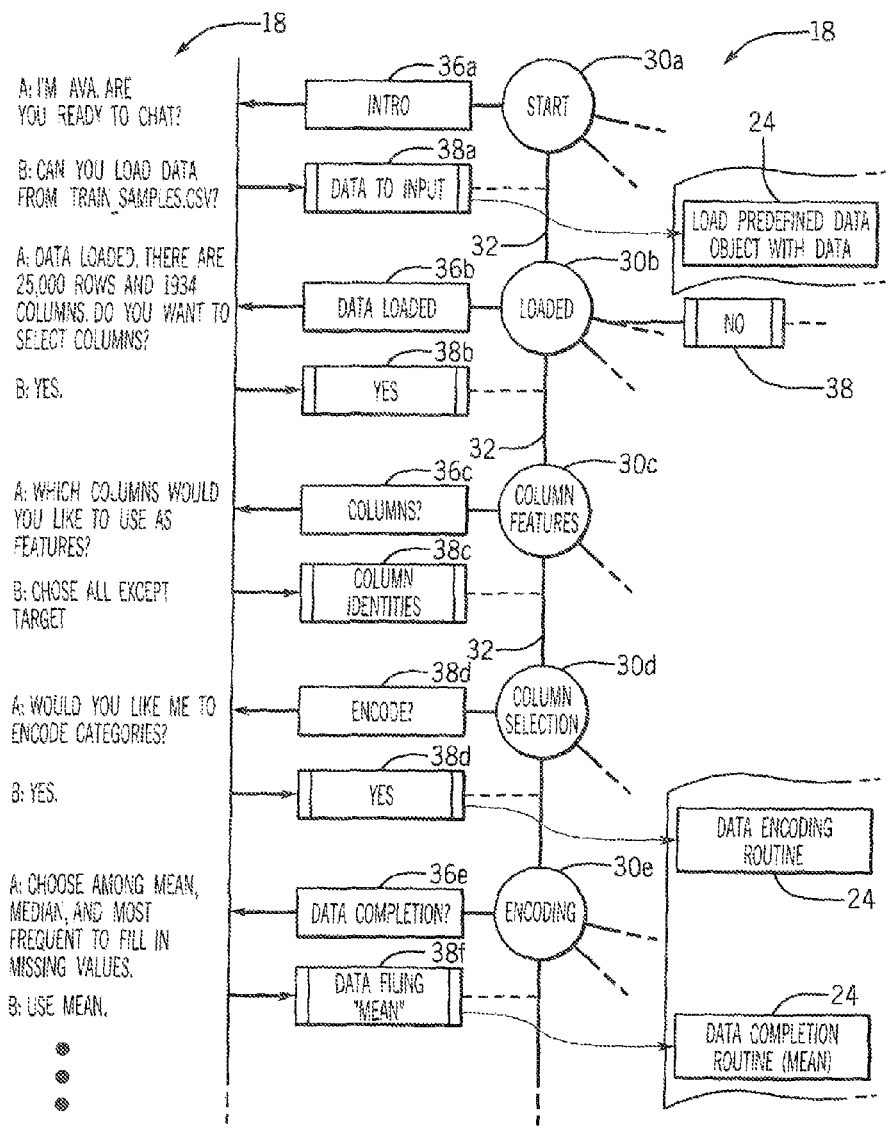
FIG. 4 is a flow chart of an example portion of a conversation as implemented by the present invention providing access to sophisticated data analysis tools.

Referring now to FIG. 4, an example generation of a conversation 20 of the type provided by the present invention will now be described. In this process, the conversational programming interface 10 initializes at a first stage 21 and its first sub-stage 30, in this case indicated by sub-stage 30a, is a starting state. The starting sub-stage 30a will be associated with a natural language output cue 36a, for example, introducing the program, for example, with a statement such as:

"Hello! I am Ava, the data science chat-bot. I'm ready to chat."

This output is communicated to the domain expert 14 and recorded in the file 16 as part of the generated conversational source code as well as displayed on display 19. The chat-bot 12 then monitors the natural language input grammars 38 of all state transitions from sub-stage 30a, for example, looking for a natural language input grammar 38a indicating an identification of a data file to be processed, for example, per the natural language statement:

"Can you load data from train_sample.csv?"

This matching is done in a content domain and does not require an exact phrasing as shown above. This statement like all statements from the chat-bot and to the chat-bot is recorded in file 16 and displayed in conversation 20 on display 19.

In response to a matching of the natural language input grammar 38, the chat-bot 12 may execute a code fragment 24 that will undertake a loading of the indicated data. At this time the standard input variable used for the data being processed "data_set_1" is associated with the user supplied alias of "train_sample.csv" and the code fragment 24, and subsequent code fragments 24 may make use of the standard input variable in dealing with this data set. When the code fragment 24 is complete, state transition 32a from sub-stage 30a to sub-stage 30b may be invoked.

At sub-stage 30b, the natural language output cue 36b indicating that the data was successfully loaded is provided to the domain expert 14 to preserve context for the process, for example, with the statement:

"Data loaded successfully. There are 25,000 rows in 1934 columns in your data. Do you want to select columns as features?"

This natural language output cue 36b both confirms the previous operation and provides the domain expert 14 with an option appropriate to the sub-stage 30b.

The chat-bot 12 then monitors responses associated with different state transitions from sub-stage 30b, for example, receiving a "yes" response matching grammar 38b causing a transition to sub-stage 30c. For this particular matching grammar 38b no fragment 24 need be invoked.

At sub-stage 30c, natural language output cue 36c requests an identification of the columns to be selected in accordance with the response of the previous state transition, for example, stating:

"Which columns would you like to use as features?"

The chat-bot 12 again monitors the natural language input grammars 38 leading from sub-stage 30c (possibly iteratively) receiving the user-defined column names in placeholders and matching those user-defined column names as aliases to the column headers of the loaded file. Each match identifies the match columns to standard data object names 40 in data object table 26 for use by any of the program fragments 24. This use of standard data object names 40 allows the later program fragments 24 to be prewritten for use with the standard variables and yet to be responsive to new variable names introduced by the domain expert 14. These steps may be implemented by general program instructions incorporated into the conversational programming interface 10.

In this case, the chat-bot 12 may receive a command from the domain expert 14 of: "Choose all, except target" matching natural language input grammar 38c, allowing all of the columns except for the target to be marked for use by later program fragments.

Satisfaction of the natural language input grammar 38c causes state transition 32 from sub-stage 30c to sub-stage 30d to occur invoking the natural language output cue 36d of:

"Would you like me to encode categorical features?"

This question is related to a step of feature engineering before analysis. A response of "yes" (matching natural language input grammar 38d) causes a state transition to sub-stage 30e and an invocation of the code fragment 24 to perform the necessary encoding modifying the data appropriately with reference to the standardized variables.

At sub-stage 30e, a natural language output cue 36 asks the domain expert 14 about how to manage missing values, for example, to fill in those missing values with averages or the like with a statement of:

"Choose among mean, median, and most frequent to fill in missing values".

The sub-stage 30e in this case will have multiple state transitions 32 leading from it to different options associated with filling in missing data, one of which will be selected depending on the response received from the domain expert 14. For example, the natural language statement of: "Use mean" may match a natural language input grammar 38f associated with the program fragment 24 providing this function.

It will generally be appreciated that multi-state template 18 may be preprepared and then used for many different data analysis problems having the same stages 21. To the extent that the stages 21 of the multi-state template 18 are modular (having single entry and exit points and predefined variables), it is relatively easy to generate new multi-state templates 18 by starting with previously generated multi-state templates 18 and changing the stages 21. In one embodiment, the natural language input grammars 38 and natural language output cues 36 related to each code fragment 24 may be incorporated into the code fragments 24 and compiled into the multi-state template 18. In this way the code fragments 24 may carry with them hints and the ability to make recommendations to the domain expert 14 with respect to how to treat or handle the data that they are associated with. Otherwise, a variety of analysis frameworks may be easily implemented in the construction of the multi-state templates 18 simply by identifying or generating the necessary cues 36, grammars 38 and code fragments 24.

Figure 7:
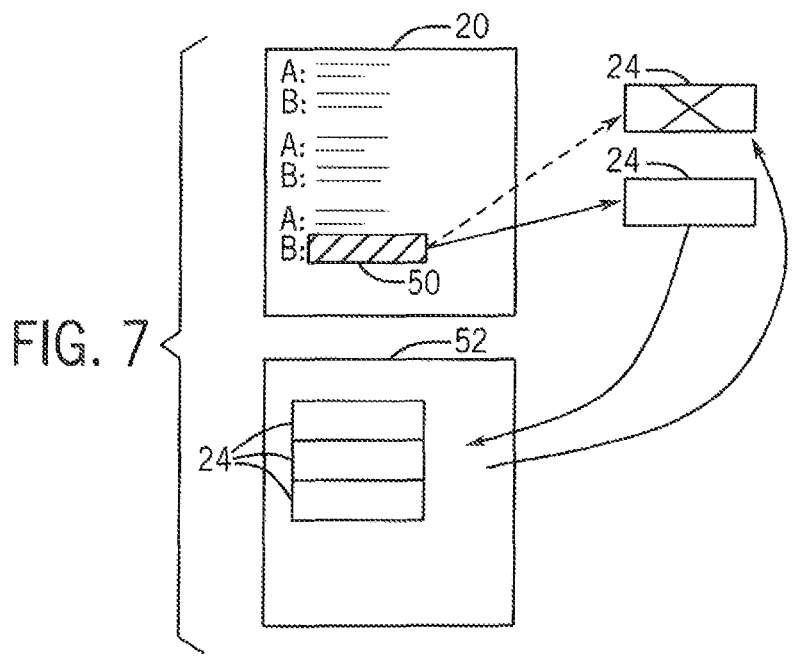
FIG. 7 is an example display of a conversation showing a highlighting of conversational elements for editing.

Referring now to FIGS. 1 and 7, at the conclusion of this process of FIG. 4, a complete record of the process and the necessary data analysis is captured in the conversation 20 together with the desired output, for example, in the form of charts or the like (displayed graphically in line with the conversation in the manner of a workbook). The source code is naturally "commented" to the extent that it provides natural language explanation of each of the steps of data analysis and the outputs.

Importantly, this conversation 20 can be saved by saving file 16 and re-executed at a later date on the same named data, for example, which may have changed. More typically, prior to such reexecution, portions of the conversation 20 may be edited, for example, to change the source data files from repository 28 but any feature of the conversation 20 may be changed by invoking editing commands that may be implemented also through natural language or more typically through normal input devices such as keyboards and the like. In this process, any given user input 50 in the conversation 20 may be highlighted and may be replaced, for example, with a natural language input. The program moves to the necessary sub-stage 30 and uses the chat-bot to interpret the new natural language instruction to match it to a given fragment 24 or a fragment 24 as may be necessary or to otherwise change the data object table 26. All subsequent fragments 24 (as previously defined by the conversation 20) are then re-executed.

The invention contemplates that the code fragments 24 as invoked by the conversation 20 may be assembled together as the conversation 20 is constructed, and these code fragments 24 displayed as a program view 52 allowing the expert to simultaneously view the conversation 20 and the corresponding underlining code of the multiple code fragments 24 for best understanding of the process being performed and even to provide editing through the program view 52.

When the user saves the conversation 20, options may exist to remove iterations, for example, experiments with possible ways of analyzing the data that were not ultimately used so as to provide a template for future use that has been pruned of unnecessary side paths.

It will be appreciated that the code fragments 24 may make use of existing tools or programs for data analysis providing the data to those tools in command line form to receive responses without the need for necessary reconstructing or writing the code of the code fragments 24.

Figure 3:
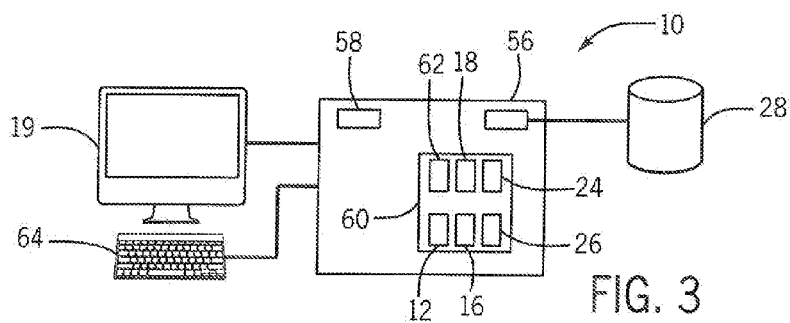
FIG. 3 is a block diagram of an electronic computer suitable for implementation of the present invention.

Referring now to FIG. 3, the conversational programming interface 10 may be implemented on standard desktop computer 56 having one or more processors 58 communicating with a memory 60 holding a stored program generating program 62 implementing the above described conversational programming interface 10 together with one or more multi-state templates 18, code fragments 24, a data object table 26, one or more conversational storage file 16, and a chat-bot 12. The computer 56 may communicate with a display 19, for example, a graphic display and a keyboard 64 and may connect to the data repository 28 holding the user data.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computerized user interface for data analysis comprising an electronic computer including:
   a processor;
   electronic memory communicating with the processor and holding a program-generating program and a set of multi-instruction program components; and
   a user interface communicating with the processor;
   wherein the processor executes the program-generating program to:
   (a) generate a conversation comprised of:
      (i) natural language phrases input by a user using the user interface and designating a data set for analysis and one or more analysis tools to be used in the analysis; and
      (ii) natural language phrases output by the computer using the user interface in response to the natural language phrases input by the user and providing the user with guidance for additional natural language phrases input by the user;
   (b) record the conversation; and
   (c) execute the conversation by mapping the natural language phrases input by the user and the additional natural language phrases input by the user to corresponding multi-instruction program components to create a data analysis program implementing analysis of the one or more analysis tools on the data set; and executing the data analysis program to output that analysis to the user interface.

2. The computerized user interface of claim 1 wherein the program-generating program further displays the conversation contemporaneously with generation of the data analysis program.

3. The computerized user interface of claim 2 wherein the processor further executes the program-generating program to perform the steps of:
   (d) storing and recall the conversation; and
   (e) editing the recalled conversation before repeating step (c).

4. The computerized user interface of claim 3 wherein the recalled conversation is displayed and the editing is guided by identifying portions of the conversation on the display and editing those portions through an addition of new natural language phrases input by the user.

5. The computerized user interface for data analysis of claim 4 wherein the editing of the recalled conversation allows removal of existing natural language phrases and an addition of further natural language phrases at a variety of points within the conversation and wherein the removal of a given existing natural language phrase from the conversation causes a removal of a corresponding multi-instruction program component during execution of the conversation and wherein the addition of a given further natural language phrase to the conversation causes an addition of a corresponding multi-instruction program component during the execution of the conversation.

6. The computerized user interface of claim 1 wherein the program-generating program further executes to include a step of receiving commands from the user to edit the data analysis program before executing the data analysis program at step (c).

7. The computerized user interface of claim 1 wherein the program-generating program further includes a predefined multi-state template designating steps for a workflow, the multi-state template defining states associated with predefined possible natural language phrases output by the computer and state transitions associated with predefined possible natural language phrases input by the user.

8. The computerized user interface of claim 7 wherein the natural language phrases output by the computer provide hints with respect to possible state transitions of the predefined multi-state template for a given current state of the multi-state template.

9. The computerized user interface of claim 7 wherein the predefined possible natural language phrases input by the user are each associated with a corresponding multi-instruction program component.

10. The computerized user interface of claim 7 wherein the multi-state template is composed of modules each providing multiple states and selected from the group consisting of states related to: data loading, data cleaning, data analysis, model selection, and visualization of analysis.

11. The computerized interface of claim 10 wherein the modules provide for standardized interfaces so that a given module of the multi-state template can be replaced by a different module.

12. The computerized user interface for data analysis of claim 1 wherein the natural language phrases input the u ad the natural language phrases output by the computer conform to standard spoken language grammar and syntax.

13. The computerized user interface for data analysis of claim 1 wherein the multi-instruction program components are human readable instructions and a non-natural language computer language.

14. A method of computerized data analysis employing an electronic computer having a processor; and electronic memory communicating with the processor and holding a program-generating program and a set of multi-instruction program components; and a user interface communicating with the processor, the method comprising:
   (a) generating a conversation comprised of:
      (i) natural language phrases input by a user using the user interface and designating one or more data sets for analysis and one or more analysis tools to be used in the analysis; and
      (ii) natural language phrases output by the computer using the user interface in response to the natural language phrases input by the user and providing the user with guidance for additional natural language phrases input by the user,
   (b) recording the conversation; and
   (c) executing the conversation by mapping the natural language phrases input by the user and the additional natural language phrases input by the user to corresponding multi-instruction program components to create a data analysis program implementing analysis of the one or more analysis tools on the data set; and executing the data analysis program to output that analysis to the user interface.

15. The method of claim 14 including the step of displaying the conversation contemporaneously with generation of the data analysis program.

16. The method of claim 15 including the step of:
   (d) storing and recall the conversation; and
   (e) edit the recalling conversation before repeating step (c).

17. The method of claim 16 wherein the recalled conversation is displayed and the editing is guided by identifying portions of the conversation on the display and editing those portions through an addition of new natural language phrases input by the user.

* * * * *